(12) United States Patent
Hernandez et al.

(10) Patent No.: US 7,166,457 B1
(45) Date of Patent: Jan. 23, 2007

(54) **METHOD FOR TREATING BACTERIAL EFFLUENTS CONTAINING AT LEAST A *GORDONIA TERRAE* CIP I-2194 ETHER**

(75) Inventors: Guillermina Hernandez, Paris (FR); Alan Francois, Soisy S/ Montmorency (FR); Pascal Piveteau, Rueil Malmaison (FR); Francoise Fayolle, Clamart (FR); Frederic Monot, Nanterre (FR)

(73) Assignee: Institut Fracois du Petrole, Rueil Malmaison Cedex (FR)

( * ) Notice: Subject to any disclaimer, the term of this patent is extended or adjusted under 35 U.S.C. 154(b) by 681 days.

(21) Appl. No.: 10/129,627

(22) PCT Filed: Nov. 9, 2000

(86) PCT No.: PCT/FR00/03113

§ 371 (c)(1),
(2), (4) Date: Sep. 20, 2002

(87) PCT Pub. No.: WO01/34528

PCT Pub. Date: May 17, 2001

(30) Foreign Application Priority Data

Nov. 9, 1999 (FR) .................................. 99 14211

(51) Int. Cl.
*C12S 13/00* (2006.01)
(52) U.S. Cl. ............................... 435/262.5; 435/253.1; 435/821; 435/863; 210/611
(58) Field of Classification Search ................ 435/262, 435/262.5, 244, 245; 210/611
See application file for complete search history.

(56) References Cited

U.S. PATENT DOCUMENTS

| 5,814,514 | A | * | 9/1998 | Steffan et al. | ............... 435/262 |
| 6,040,154 | A | * | 3/2000 | Fayolle et al. | ................ 435/42 |
| 6,254,777 | B1 | * | 7/2001 | Hernandez et al. | ......... 210/611 |
| 6,632,649 | B1 | * | 10/2003 | Pivetau et al. | ........... 435/252.1 |

FOREIGN PATENT DOCUMENTS

FR 2766478 1/1999

OTHER PUBLICATIONS

Fayolle et al: "Isolation of two aerobic bacterial strains that degrade efficiently ethyl t-butyl ether (ETBE)" Biotechnology Letters, GB, Kew, Surrey, vol. 20, No. 3, Mar. 1998, pp. 283-286-288, XP002115642, ISSN: 0141-5492.

* cited by examiner

*Primary Examiner*—William H. Beisner
(74) *Attorney, Agent, or Firm*—Millen, White, Zelano & Branigan, P.C.

(57) ABSTRACT

A process for the treatment of aqueous effluents containing at least one of the following ethers is described: ethyl tert-butyl ether (ETBE) and/or methyl tert-butyl ether (MTBE) and/or tert-amyl methyl ether (TAME) in order to reduce the concentration of these ethers. A bacterium *Gordonia terrae* CIP I-2194 is innoculated under aerobic conditions. In particular, a bacterium *Burkholderia cepacia* CIP I-2052 or a bacterium *Alcaligenes* sp. CIP I-2561 or a bacterium *Mycobacterium* sp. CIP I-2562 is added in the presence of a growth substrate and, optionally, of a cobalt salt, and the ether contained in the effluents is degraded by the bacteria thus innoculated until its mineralization. The process is useable in the ether-contaminated water treatment industry.

16 Claims, 2 Drawing Sheets

METHOD FOR TREATING BACTERIAL EFFLUENTS CONTAINING AT LEAST A *GORDONIA TERRAE* CIP I-2194 ETHER

The invention relates to a bacterial treatment process by microorganisms capable of degrading at least one ether, in particular ethyl tert-butyl ether (ETBE) and/or methyl tert-butyl ether (MTBE) and/or tert-amyl methyl ether (TAME) contained in aqueous effluents.

It particularly relates to the water treatment industry.

It is known that methyl tert-butyl ether, designated hereafter by the term MTBE, as well as tert-amyl methyl ether, designated hereafter by the term TAME, are ethers which can be used in particular as oxygenated additives in unleaded gasolines with the aim of increasing their octane rating. The increasing use of additives such as MTBE, TAME or ethyl tert-butyl ether, designated hereafter by the term ETBE, involves the storage and transport of large volumes, mixed in gasolines in particular. It is therefore necessary to know the behaviour of these compounds in case of accidental spillage leading to pollution of the soil and underground or surface waters. MTBE is an ether produced by the condensation of methanol with isobutene, TAME is an ether produced by the condensation of methanol with isopentene and ETBE is an ether produced by the condensation of methanol with isobutene. The structure of these compounds which comprise an ether bond as well as a tertiary carbon, is such as to make them very resistant to biodegradation by microorganisms present in the environment.

The literature concerning the biodegradation of these different ethers used as additives in gasolines shows that the metabolism of these compounds requires in the majority of cases the use of bacteria or mixed cultures selected beforehand as their presence in the environment is not common (J. P. Salanitro et al., Demonstration of the enhanced MTBE bioremediation (EMB) in situ process, In Situ and On-Site Bioremediation, 19–22 Apr. 1999, San Diego, Calif.).

The Applicant has previously isolated a bacterium *Gordonia terrae* (ex-*Gordona terrae*) CIP I-1889 which has proved capable of growing, partially using ETBE as carbon and energy source, the ETBE being degraded to the stage of tert-butyl alcohol (TBA) which can then be used as a carbon and energy source by another bacterium *Burkholderia cepacia* (ex-*Pseudomonas cepacia*) CIP I-2052 also isolated by the Applicant (Patent Application FR 2 766 478) or by a bacterium *Alcaligenes* sp. CIP I-2561 or a bacterium *Mycobacterium* sp. CIP I-2562 also isolated by the Applicant. It has been found that the bacterium *G. terrae* CIP I-1889, which is not capable of degrading MTBE or TAME using them as a carbon and energy source, is capable of degrading these compounds by co-metabolism when it is cultured in the presence of a suitable growth substrate such as for example ETBE or ethanol (Patent Application FR 2 787 783). If the bacterium *G. terrae* CIP I-1889 is cultured on ethanol and in the presence of MTBE and/or TAME in mixed culture with the bacterium *B. cepacia* CIP I-2052, the MTBE and TAME are degraded to TBA and tert-amyl alcohol (TAA) respectively which can then be used as a carbon and energy source by *B. cepacia* CIP I-2052 (Patent Application FR 2 787 783) or by the bacterium *Alcaligenes* sp. CIP I-2561 or the bacterium *Mycobacterium* sp. CIP I-2562.

However, the bacterium *G. terrae* CIP I-1889 has the drawback of having a latency phase in its growth.

One of the objects of the invention is to remedy the drawbacks of the prior art.

Another object is to describe an aerobic process which uses these new bacterium for the treatment of contaminated waters with the purpose of degrading the MTBE, ETBE or TAME contained in solutions and more generally in compounds containing at least one alkoxy group and in particular a tert-alkoxy group. In so doing, the residual concentrations of ether in urban or industrial waste water or aquifers contaminated by these products or by fuels which may contain these oxygenated products are significantly lowered.

In a more detailed manner, the invention relates to a process for the treatment of aqueous effluents containing at least one ether, preferably ethyl tert-butyl ether (ETBE) and/or methyl tert-butyl ether (MTBE) and/or tert-amyl methyl ether (TAME) in order to reduce the concentration of said ether, characterized in that at least one bacterium *Gordonia terrae* CIP I-2194 is grown under aerobic conditions in the presence of a growth substrate and the ether contained in the effluents is degraded in the presence of said substrate by the biomass of said bacteria thus produced.

According to an embodiment of the process, when the aqueous effluents essentially contain MTBE, the MTBE contained in the effluents can advantageously be degraded by also introducing into it, in a joint or dissociated fashion, at least one bacterium chosen from the group formed by *Burkholderia cepacia* CIP I-2052, *Alcaligenes* sp. CIP I-2561, *Mycobacterium* sp. CIP I-2562, *Arthrobacter globiformis* ATCC 53596, *Bacillus coagulans* ATCC 53595, *Pseudomonas stutzeri* ATCC 53602 and *Mycobacterium vaccae* JOB5 ATCC 29678.

When used in this way, the tert-butyl ether is degraded to tert-butyl alcohol (TBA) and the almost total degradation of TBA to carbon dioxide and water is carried out by the additional of the mentioned bacteria which have the capability to grow on the TBA thus produced. These Strains, *B. Cepacia* CIP I-2052, *Alcaligenes* sp. CIP-I-2561 and *Mycobacterium* sp. CIP I-2562 have been deposited by the Applicant at the Institut Pasteur (CNCM, 25, rue du Docteur-Roux, F-75724, PARIS, CEDEX). *G. terrae* CIP I-2194 has been deposited with the Institut Pasteur, Collection Nationale de cultures de Microorganism 25, Rue de Docteur Roux, F-75724, Paris, Cedex 15, on May 5, 1999 under accession number I-2194. Any other bacterium capable of growing on TBA can also be included in the scope of the present invention.

According to another embodiment of the process, when the effluents contain essentially TAME, the TAME contained in the effluents can be degraded by also introducing into it, in a joint or dissociated fashion, a bacterium *B. cepacia* CIP I-2052 or a bacterium *Alcaligenes* sp. CIP I-2561 or a bacterium *Mycobacterium* sp. CIP I-2562 which have the ability to also grow on tert-amyl alcohol (TAA) a degradation product of TAME and to almost totally degrade it to carbon dioxide and water. Any other bacterium capable of growing on TAA can also be included in the scope of the present invention.

According to another embodiment allowing an improvement in the growth of the bacterium *B. cepacia* CIP I-2052 or the bacterium *Alcaligenes* sp. CIP I-2561 or the bacterium *Mycobacterium* sp. CIP I-2562, it can be grown in the presence of TBA and/or TAA and at least one cobalt salt, preferably cobalt chloride. Under these conditions, the concentration of TBA and/or TAA can be comprised between 0.01 and 10 g/L of effluents and that of the cobalt salt between 0.01 and 4 mg/L.

According to an embodiment of the invention, the bacterium *G. terrae* CIP I-2194 selected from *G. terrae* CIP I-1889 is generally innoculated on a growth substrate which can be, for example, at least one compound chosen from the group formed by ethanol, isopropanol, n-butanol, n-pentanol, a monosaccharide, a disaccharide, dibutyl ether, ethyl butyl ether, ethyl tert-butyl ether, acetone, ethylene glycol, glycerol and tryptone.

Other growth substrates based on carbon and hydrogen can be provided.

Each bacterium may grow differently in the presence of a given type of substrate. Excellent results were obtained using ethanol and/or acetone as growth substrates.

This particular growth substrate can be introduced at a concentration which does not exceed the toxicity threshold of this substrate for the bacterium considered, for example at a concentration at least equal to that of the ether to be degraded and advantageously comprised between 0.1 mg/L and 5500 mg/L of effluents. Thus, it was noted that when the bacterium according to the invention is cultured in the presence of a growth substrate which is ETBE, i.e. an aqueous effluent containing it and which one wishes to treat, it present no latency phase during growth, contrary to what was observed when using G. terrae CIP I-1889.

When it is a question of degrading the MTBE and/or TAME contained in the aqueous effluents to be cleaned up, it was noted that the bacterium according to the invention proved capable of initiating the degradation of these ethers, even in the absence of growth substrate. However, it is preferable to use a growth substrate as described above and, for example, ethanol or isopropanol.

This bacterium G. terrae CIP I-2194 is said to be constitutive for the degradation of ethers, i.e. the enzymes responsible for the initial attack on the ethers are produced in a constitutive fashion and do not require a prior induction in order to be used. Such a strain which grows in the presence of a growth substrate such as ethanol will advantageously be combined, within the scope of a mixed culture, to degrade the ethers ETBE, MTBE and/or TAME with the bacterium B. cepacia CIP I-2052 or with the bacterium Alcaligenes sp. CIP I-2561 or the bacterium Mycobacterium sp. CIP I-2562 which are grown in the presence of a cobalt salt. Under these conditions, the degradation of the ether starts immediately and the resulting TBA and/or TAA is, in turn, degraded almost totally and very rapidly. The bacteria can tolerate a wide range of ether concentrations. Preferably, aqueous effluents can be degraded which contain a concentration of ether and, in particular, of MTBE or TAME or ETBE at least equal to 5,000 mg/L and more particularly comprised between 0.01 mg/L and 400 mg/L. Nevertheless it is still possible to dilute the effluent in order to operate under optimal conditions, compatible with the degradation capacities of the bacterial strains.

In the case where the aqueous effluents contain ethyl tert-butyl ether (ETBE) as pollutant, this ETBE can be used at least in part as growth substrate and therefore as a source of energy.

The process ensuing from the use of these bacteria is applicable for treating in particular effluents contaminated by MTBE, TAME and/or ETBE, so that the concentrations of MTBE or TAME or ETBE in discharges are compatible with the regulations in force.

The growth substrate can be provided continuously or discontinuously at a concentration which ensures the supply of energy required for biodegradation, for example at a concentration at least equal to that of the ether to be degraded.

The use of these bacteria for the treatment of effluents contaminated by MTBE or ETBE or TAME can be carried out in the following manner: for example in a biofilter where the bacteria are fixed on a mineral or organic support or they can be added as inoculum to sewerage plant sludges.

These bacteria can also be used for the in situ treatment of contaminated aquifers by injecting them as inoculum with a suitable growth substrate into shafts drilled in the aquifer.

When said bacteria are developed on a biofilter system of appropriate volume, the effluents containing the ether, in particular MTBE, ETBE and/or TAME, can be introduced into the biofilter in the presence of air or oxygen at a suitable feed rate of 0.05 L/L to 5 L/L, for example of 0.1 to 2 L/L biofilter/hour depending on the concentration of contaminant to be treated and the effluent rid at least in part of the contaminating ether is drawn off.

BRIEF DESCRIPTION OF THE DRAWINGS

The invention will be better understood from the following examples and figures of which.

EXAMPLE 1 (COMPARATIVE)

Figure 1:
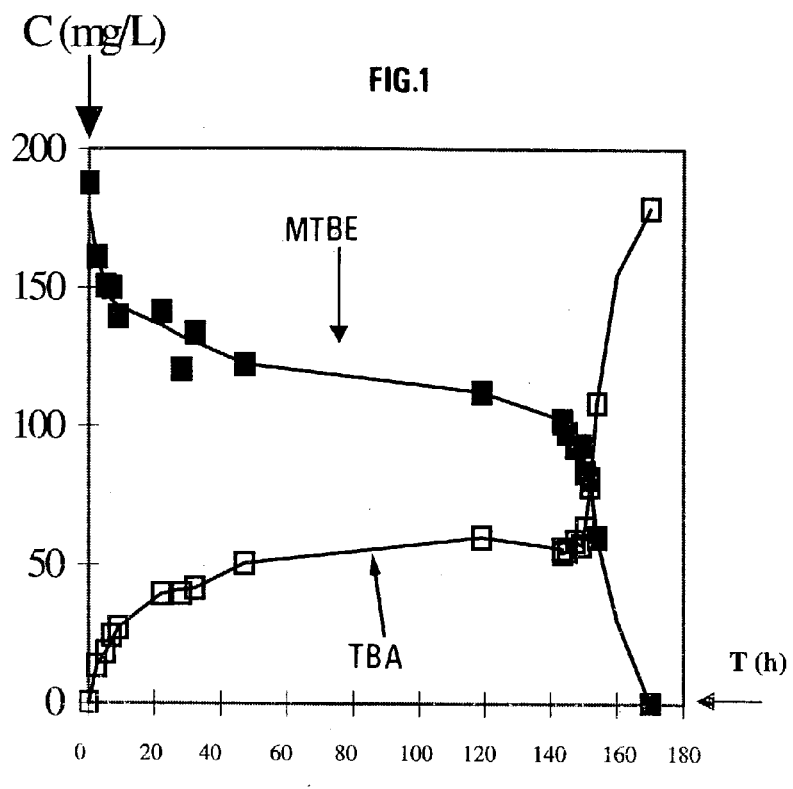
FIG. 1 shows the MTBE degradation capacity of a culture of Gordonia terrae CIP I-2194 in the presence of ethanol.

Isolation of a New Strain of Gordonia terrae CP-2194 and Comparison of its Growth with the Growth of Gordonia terrae CIP I-1889 in the Presence of ETBE.

The bacterium Gordonia terrae CIP I-1889 is capable of growing on ETBE (Patent FR 2 766 478) which it uses as a source of carbon and energy resulting in the accumulation of tert-butanol (TBA). This bacterium was cultured by successive subcultures several times on the minimum medium MM1 containing ETBE as source of carbon and energy and the composition of which is as follows:

| | |
|---|---:|
| $KH_2PO_4$ | 6.8 g |
| $K_2HPO_4$ | 8.7 g |
| $Na_2HPO_4, 2H_2O$ | 0.33 g |
| $NH_4Ci$ | 1.5 g |
| $CaCl_2, 2H_2O$ | 0.0364 g |
| $FeCl_3, 6H_2O$ | 0.0012 g |
| Solution of vitamins | 1 ml |
| $H_2O$ | q.s.f. 1 liter |
| pH-6.95 | |

The solution of vitamins has the following composition per 1 liter of distilled water:

| | |
|---|---:|
| Biotin | 200 mg |
| Riboflavin | 50 mg |
| Nicotinamic acid | 50 mg |
| Panthotenate | 50 mg |
| p-aminobenzoic acid | 50 mg |
| Folic acid | 20 mg |
| Thiamine | 15 mg |
| Cyanocobalamin | 1.5 mg |

ETBE is added to this medium at a high concentration, i.e. between 300 and 500 mg/L.

At the end of these different subcultures, a new bacterium which originated from the bacterium *Gordonia terrae* CIP I-1889 was obtained. It presents morphological and conventional characteristics identical to those of the mother strain. It was deposited at the collection of the Institut Pasteur, Paris, France as *Gordonia terrae* CIP I-2194. This new strain is constitutive for the expression of genes which allow the degradation of ETBE, i.e. the degradation of the ETBE occurs without the need for prior contact of the strain with the ETBE. The mother bacterium *G. terrae* CIP I-1889 is said to be inducible for the degradation of ETBE (ETBE$^+$i) and the new strain *G. terrae* CIP I-2194 is said to be constitutive for the degradation of ETBE (ETBE$^+$c).

By way of comparison, the bacterium *G. terrae* CIP I-1889 on the one hand and the bacterium *G. terrae* CIP I-2194 on the other hand are cultured separately in a vial of the MM1 medium described above and to which ETBE is added as carbon and energy source (growth substrate) at a final concentration of the order of 1 g/L.

The cultures are incubated at 30° C.

The residual concentrations of ETBE are determined from samples taken from each of the cultures and injected into a gas chromatograph equipped with an integrator which calculates the residual concentrations of ETBE and TBA produced by integration of the different peaks obtained in the chromatograms. The results obtained are presented in Table No. 1.

MTBE and the TAME. This drop in concentration of each of the ethers is correlated to the concomitant appearance of the corresponding alcohol, i.e. TBA in the case of the MTBE and tert-amyl alcohol (TAA) in the case of the TAME. Nevertheless, it is seen that although this degradation occurs without a latency phase, it is not total and stops after 40 to 60 hours of incubation.

If ethanol is then added to the culture (after about 150 hours in the figures), the degradation of the MTBE or TAME by *G. terrae* CIP I-2194 then resumes and is total in about thirty hours.

This experiment indeed confirms that the behaviour of the bacterium *G. terrae* CIP I-2194 is different from that of the mother bacterium *G. terrae* CIP I-1889, as the latter was not capable of initiating the degradation of the MTBE or the TAME in the absence of a growth substrate (Example 2 of Patent No. 98/16520). As the bacterium *G. terrae* CIP I-2194 is constitutive for the enzymes responsible for the attack on the ether bond, it is capable of initiating the degradation of the MTBE or the TAME although these compounds do not constitute a carbon and energy source, nevertheless this degradation is only partial as limitations must soon occur in the bacteria. The addition of ethanol which is the growth substrate then allows the degradation of the MTBE or the TAME to be terminated by co-metabolism, as was described for the bacterium *G. terrae* CIP I-1889.

This ability to initiate the degradation of the MTBE or the TAME in the absence of growth substrate constitutes an TABLE No. 1

Comparison of growth in the presence of ETBE of the bacteria *G. terrae* CIP I-1189 and CIP I-2194

| Strain tested | Initial ETBE concentration (mg/L) | Final TBA concentration (mg/L) | Latency phase observed before degradation of ETBE (hours) | Biomass produced (mg/L) | Duration of test (hours) | % ETBE degraded |
| --- | --- | --- | --- | --- | --- | --- |
| *G. terrae* CIP I-1889 | 985 | 714 | 94.5 | 206 | 190 | 100% |
| *G. terrae* CIP I-2194 | 873 | 633 | 0 | 250 | 78 | 100% |

As can be seen from this experiment, no latency phase (delay) is observed with the strain *G. terrae* CIP I-2194 for the degradation of ETBE. This is considered as an advantage for the use of the strains by a person skilled in the art.

EXAMPLE 2

Degradation of MTBE and TAME by *Gordonia terrae* CIP I-2194.

The capacity of the bacterium *G. terrae* CIP I-2194 to degrade MTBE and TAME was studied.

The bacterium *G. terrae* CIP I-2194 is innoculated in flasks of the MM1 mineral medium described in Example 1 and containing either MTBE or TAME as carbon source at a concentration of the order of 200 mg/L.

The cultures are incubated at 30° C.

Samples are taken at regular intervals from these cultures in order to determine by gas chromatography the residual contents of MTBE and TAME.

Figure 2:
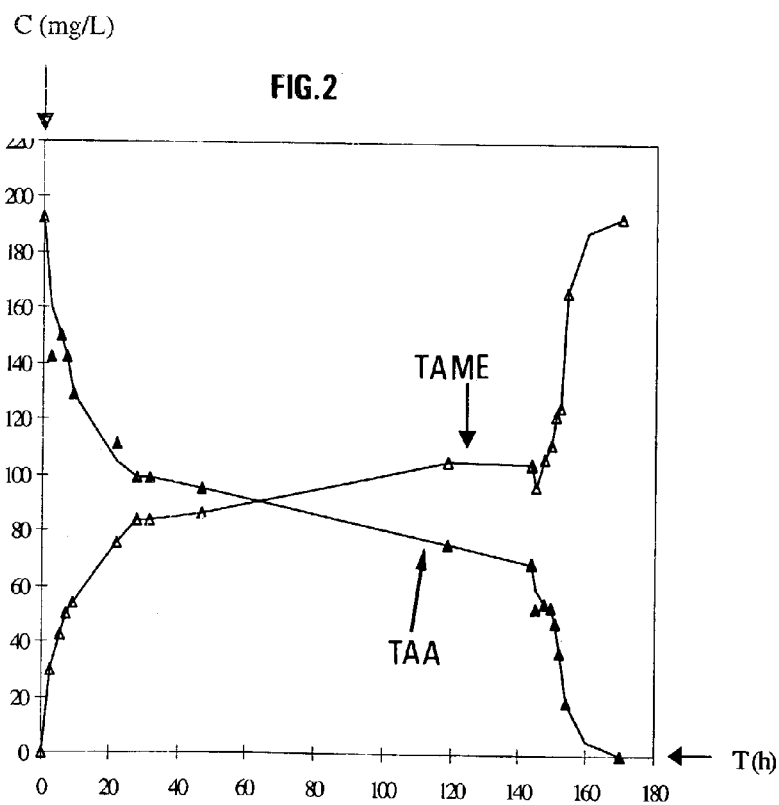
FIG. 2 illustrates the TAME degradation capacity of a culture of Gordonia terrae CIP I-2194 in the presence of ethanol.

The results are shown in FIGS. 1 and 2.

As can be seen in these figures, from innoculation. the bacterium *G. terrae* CIP I-2194 is capable of degrading the advantage of the bacterium *G. terrae* CIP I-2194 compared with the mother bacterium *G. terrae* CIP I-1889.

EXAMPLE 3

Degradation of MTBE by a Mixed Culture of *Gordonia terrae* CIP I-2194 and *Burkholderia cepacia* CIP I-2052 in the Presence of Cobalt Chloride The degradation of MTBE by a mixed culture containing *G. terrae* CIP I-2194 and *B. cepacia* CIP I-2052 in a fermenter was studied. A preculture of *G. terrae* CIP I-2194 was carried out on 200 mL of Luria medium. A preculture of *B. cepacia* CIP I-2052 was carried out on 200 mL of MM2 medium the composition of which is as follows:

| | |
| --- | --- |
| $KH_2PO_4$ | 1.4 g |
| $K_2HPO_4$ | 1.7 g |

-continued

| | |
|---|---|
| NaNO₃ | 1.5 g |
| MgSO₄, 7H₂O | 0.5 g |
| CaCl₂, 2H₂O | 0.04 g |
| FeCl₃, 6H₂O | 0.012 g |
| Solution of vitamins | 1 mL |
| H₂O | q.s.f. 1 liter |

The solution of vitamins has the following composition per 1 liter of distilled water:

| | |
|---|---|
| Biotin | 200 mg |
| Riboflavin | 50 mg |
| Nicotinamic acid | 50 mg |
| Panthotenate | 50 mg |
| p-aminobenzoic acid | 50 mg |
| Folic acid | 20 mg |
| Thiamine | 15 mg |
| Cyanocobalamin | 1.5 mg | and containing glucose at a concentration of 500 mg/L and to which was added at a rate of 10 m/L of MM2 medium a solution of trace elements containing a cobalt salt which allows an improvement in bacterium growth. This solution of trace elements has the following composition:

| | |
|---|---|
| Nitrilotriacetic acid | 1.5 g |
| Fe(NH₄)₂(SO₄)₂, 6H₂O | 0.2 g |
| Na₂SeO₃ | 0.2 g |
| CoCl₂, 6H₂O | 0.1 g |
| MnSO₄, 2H₂O | 0.1 g |
| Na₂MoO₄, 2H₂O | 0.1 g |
| ZnSO₄, 7H₂O | 0.1 g |
| AlCl₃, 6H₂O | 0.04 g |
| NiCl₂, 6H₂O | 0.025 g |
| H₃BO₃ | 0.01 g |
| CuSO₄, 5H₂O | 0.01 g | q.s.f. 1 liter of distilled water.

These precultures are used to innoculate 4 L of MM2 medium described above and to which the solution of trace elements containing the cobalt salt described above was added at the rate of 10 mL/L of culture medium. Under these conditions, the two strains are at cellular concentrations after innoculation of the order of $10^8$ u.f.c./mL for *G. terrae* CIP I-2194 and $10^7$ u.f.c./mL for *B. cepacia* CIP I-2052. The fermenter is fed in batch mode, i.e. without drawing off. The feed contains a mixture of the substrate, ethanol at 100, g/L as carbon and energy source and of co-substrate to be degraded, MTBE at 50 g/L. The feed rate is fixed at 1 mL/h. The temperature of the fermenter was fixed at 30° C. The stirring was 900 revs/min with aeration of 12.5L/Uh.

Figure 3:
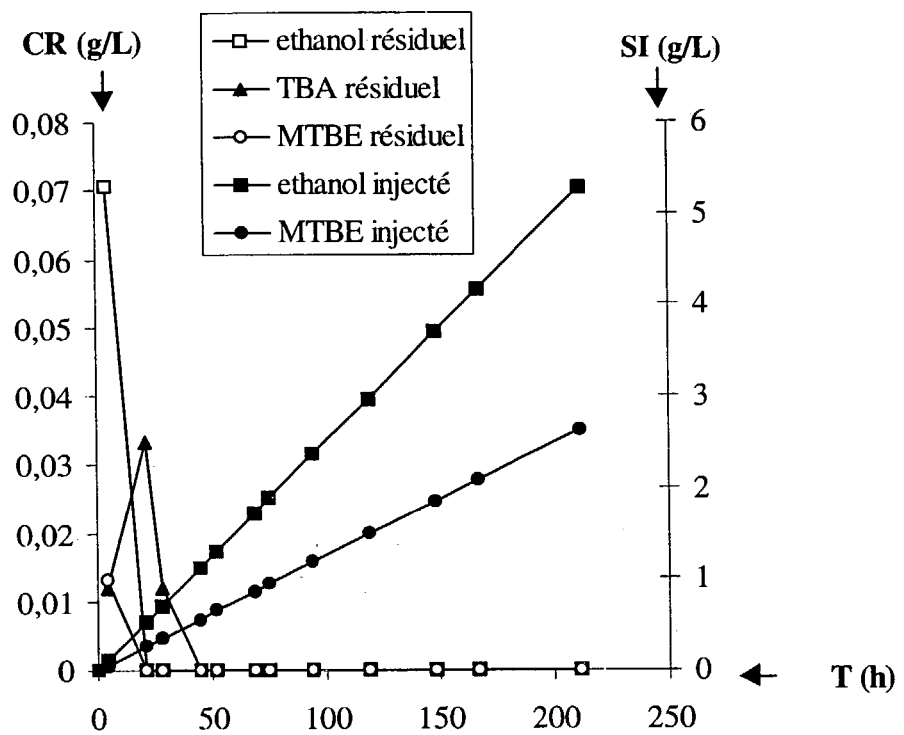
FIG. 3 shows the residual concentration (RC) of substrate which is ethanol and of MTBE as a function of time.
Figure 4:
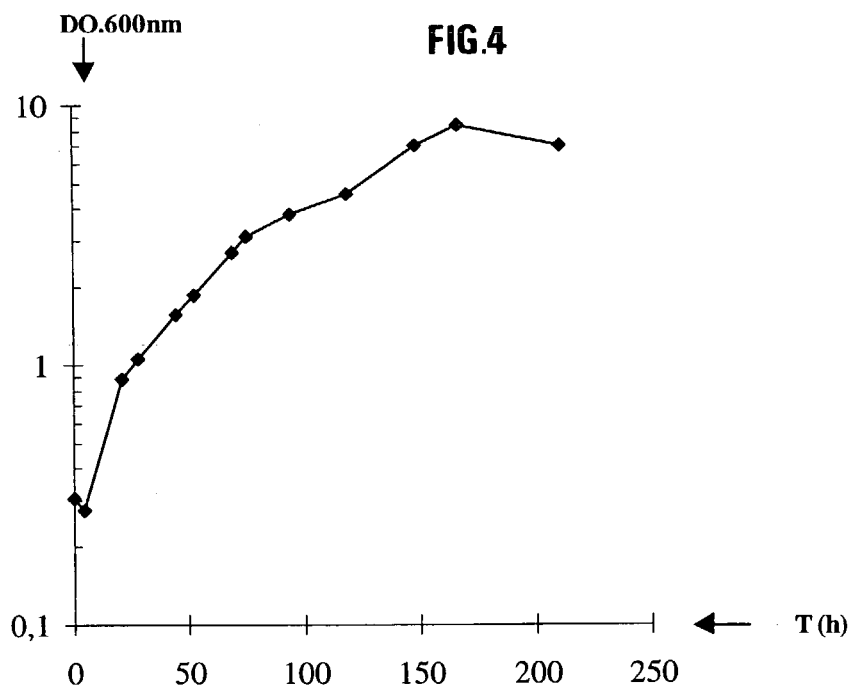
FIG. 4 represents the optical density ($OD_{600\ nm}$) expressing the growth of microorganisms as a function of time for a mixed culture of G. terrae CP I-2194 and B. cepacia CIP I-2052.

Samples were taken from the culture medium and the residual concentrations of ethanol, MTBE and TBA are determined after filtration by GC measurement. At the same time, counts are taken at regular intervals of each of the two strains *G. terrae* CIP I-2194 and *B. cepacia* CIP I-2052, by plating on dishes of Luria medium and on dishes of gelosed MM2 medium containing TBA at the rate of 500 mg/L. The results of these experiments are presented in FIGS. 3 and 4. The ethanol provided is rapidly used by the bacterium *G. terrae* CIP I-2194 and at the same time, the MTBE is also degraded to TBA without the appearance of a latency phase during the simultaneous use of the substrate, ethanol and co-substrate. The TBA thus formed accumulates at a concentration not exceeding 30 mg/L, then is rapidly reconsumed by the bacterium *B. cepacia* CIP I-2052. From 40 hours, the residual concentrations of ethanol, MTBE and TBA are zero. The respective populations of the two strains increase up to 80 hours of culture then stabilize due to the limitation of substrate (ethanol or TBA). During this experiment which lasted 210 hours, 2.4 g of injected MTBE has been degraded as well as 5.2 g of ethanol. The quantity of TBA formed from the MTBE is 2 g, these 2 g were also totally degraded.

EXAMPLE 4

Degradation of MTBE by Two Types of Mixed Cultures: 1) *Gordonia terrae* CIP I-2194 and *Alcaligenes* sp. CIP I-2561 or 2)) *Gordonia terrae* CIP I-2194 and *Mycobacterium* sp. CIP I-2562 in the Presence of Ethanol or Isopropanol 3 different precultures are carried out:

a preculture of *G. terrae* CIP I-2194 on the MM2 medium described in Example 3 and containing ETBE at 500 mg/L as carbon source.

a preculture of *Alcaligenes* sp. CIP I-2561 on the MM2 medium containing TBA at 1 g/L as carbon source.

a preculture of *Mycobacterium* sp. CIP I-2562 on the MM2 medium containing TBA at 1 g/L as carbon source.

After 48 hours' growth at 30° C. under agitation, these different precultures are centrifuged in order to recover the bacterial pellet of each strain. Each pellet is washed with MM2 medium then collected by centrifugation.

The pellet of *G. terrae* CIP I-2194 is taken up in 4.5 mL of MM2 medium, the pellet of *Alcaligenes* sp. CIP I-2561 as well as the pellet of *Mycobacterium* sp. CIP I-2562 are each taken up in 20 mL.

The optical densities at 600 nm ($O.D._{600\ nm}$) of these suspensions were able to be measured for *G. terrae* CIP I-2194 and *Mycobacterium* sp. CIP I-2562 and they are 7.32 and 2.72 respectively. The $O.D._{600\ nm}$ was not able to be measured for *Alcaligenes* sp. CIP I-2561 as this strain forms flocculates.

These cellular suspensions were used to innoculate flasks of MM2 medium (50 mL) containing either isopropanol (300 mg/L final) and MTBE (100 mg/L final), or ethanol (300 mg/L final) and MTBE (100 mg/L final). The suspensions are used at the rate of 1 mL for the strain *G. terrae* CIP I-2194 and 0.5 mL for one or other of the suspensions for *Alcaligenes* sp. CIP I-2561 and *Mycobacterium* sp. CIP I-2562.

Non-innoculated control tests constituted by flasks of MM2 medium containing isopropanol and MTBE or ethanol and MTBE are carried out under the same conditions. The flasks are incubated under agitation at 30° C. for 72 hours.

The initial $O.D._{600\ nm}$ was able to be calculated in the case of mixed cultures of *G. terrae* CIP I-2194 and *Mycobacterium* sp. CIP I-2562, it is approximately 0.17. After 72 hours, samples of each culture and of the controls are taken, filtered (0.22 µm) and measured by GC in order to determine the residual substrates. The results are shown in Table No. 2.

TABLE 2

Residual MTBE and ethanol or isopropanol contents of mixed cultures of G. terrae CIP I-2194 with Alcaligenes sp. CIP I-2561 or Mycobacterium sp. CIP I-2562

| Mixed culture used | Final MTBE content | Final TBA content | Final ethanol content | Final isopropanol content | Final O.D.$_{600\,nm}$ |
|---|---|---|---|---|---|
| G. terrae CIP I-2194/ Alcaligenes sp. CIP I-2561 (ethanol + MTBE) | 0 | 0 | 0 | — | n.d.* |
| G. terrae CIP I-2194/ Alcaligenes sp. CIP I-2561 (isopropanol + MTBE) | 0 | 0 | — | 0 | n.d.* |
| G. terrae CIP I-2194/ Mycobacterium sp. CIP I-2562 (ethanol + MTBE) | 0 | 0 | 0 | — | 0.41 |
| G. terrae CIP I-2194/ Mycobacterium sp. CIP I-2562 (isopropanol + MTBE) | 0 | 3.3 mg/L | — | 0 | 0.44 |

*n.d: not determined

It was verified that in the controls neither the MTBE nor the ethanol nor the isopropanol in the mixture are degraded.

As can be seen from the results of this experiment, the MTBE is totally degraded in the presence of isopropanol or ethanol by G. terrae CIP I-2194. The TBA formed during this degradation is then used by Alcaligenes sp. CIP I-2561 or by Mycobacterium sp. CIP I-2562 as a carbon and energy source. The ethanol or isopropanol are entirely used up.

A second addition of MTBE and substrate, ethanol or isopropanol, in the same quantity as during the first addition was carried out and the flasks were again incubated. The measurements were carried out after 24 hours, then after 48 hours' incubation.

After incubation for 24 hours, there was no longer any MTBE, ethanol or isopropanol in any of the flasks. Also there was no longer any residual TBA in the flasks of mixed cultures of G. terrae CIP I-2194/Alcaligenes sp. CIP I-2561. On the other hand, residual TBA remained in the mixed cultures of G. terrae CIP I-2194/Mycobacterium sp. CIP I-2562 but after incubation for 48 hours there was no longer any residual TBA in these mixed cultures.

The complete degradation of a second addition of MTBE/ethanol or MTBE/isopropanol indeed confirms the degradation capacity of the different mixed cultures which were tested.

The invention claimed is:

1. A process for the treatment of an aqueous effluent containing at least one contaminant selected from the group consisting of ethyl tert-butyl ether (ETBE), methyl tert-butyl ether (MTBE), and tert-amyl methyl ether (TAME) in order to reduce the concentration of said contaminant, wherein said process comprises growing at least one bacterium Gordonia terrae CIP I-2194 under aerobic conditions in the presence of a growth substrate, wherein said contaminant contained in the effluent is degraded in the presence of at least said growth substrate by at least the biomass of said bacteria thus produced.

2. A process according to claim 1, wherein the aqueous effluents essentially contain MTBE and further comprising introducing into said aqueous effluent, in a joint or dissociated fashion, at least one further bacterium chosen from the group consisting of Burkholderia cepacia CIP I-2052, Alcaligenes sp. CIP I-2561, Mycobacterium sp. CIP I-2561, Arthrobacter globiformis ATCC 53596, Bacillus coagulans ATCC 53595, Pseudomonas stutzeri ATCC 53602 and Mycobacterium vaccae JOB5 ATCC 29678, so as to degrade the MTBE.

3. A process according to claim 2, wherein the bacterium Burkholderia cepacia CIP I-2052 or Alcaligenes sp. CIP I-2561 or Mycobacterium sp. CIP I-2562 is grown, in the presence of tert-butyl and/or tert-amyl alcohol and at least one cobalt salt.

4. A process according to claim 3, wherein the concentration of tert-butyl and/or tert-amyl alcohol is comprised between 0.01 and 10 g/L of effluents and that of the cobalt salt is between 0.01 and 4 mg/L.

5. A process according to claim 3 wherein said at least one cobalt salt comprises cobalt chloride.

6. A process according to claim 5 wherein the concentration of said cobalt salt is between 0.01 and 4 mg/L.

7. A process according to claim 1, wherein the aqueous effluents essentially contain TAME and further comprising introducing into said aqueous effluent, in a joint or dissociated fashion, at least one further bacterium selected from the group consisting of Burkholderia cepacia CIP I-2052, Alcaligenes sp. CIP I-2561 and Mycobacterium sp. CIP I-2562, so as to degrade the TAME.

8. A process according to claim 1, further comprising selecting the bacterium Gordonia terrae CIP I-2194 from a bacterium G. terrae CIP I-1889 after successive subculturing of said CIP I-1889 in the presence of ETBE.

9. A process according to claim 1, wherein the growth substrate comprises at least one compound chosen from the group consisting of ethanol, isopropanol, n-butanol, n-pentanol, a monosaccharide, a disaccharide, dibutyl ether, ethyl butyl ether, ethyl tert-butyl ether, acetone, ethylene glycol, diethylene glycol, glycerol and tryptone, at a concentration at least equal to that of the ether to be degraded.

10. A process according to claim 1, wherein the MTBE, ETBE and TAME concentration of the effluent is at most equal to 5 g/L.

11. A process according to claim 10 wherein said concentration is between 0.01 mg/L and 400 mg/L.

12. A process according to claim 1, wherein said bacteria are developed on a biofilter, the effluent containing at least one of said contaminants is introduced into the biofilter in the presence of air or oxygen at a feed rate of 0.1 to 2 L/L biofilter/hour and the effluent depleted at least in part of MTBE and/or TAME is drawn off.

13. A process according to claim 1, wherein the aqueous effluent comprises an aquifer and into which said bacteria are injected as inoculum with the growth substrate, in the presence of air or oxygen, via shafts drilled in said aquifer.

14. A process of according to claim 1, wherein ether degradation enzymes are constitutively produced in said CIP I-2194.

15. A process for the treatment of an aqueous effluent containing at least one contaminant selected from the group consisting of ethyl tert-butyl ether (ETBE), methyl tert-butyl ether (MTBE), and tert-amyl methyl ether (TAME) in order to reduce the concentration of said contaminant, wherein said process comprises growing at least one bacterium *Gordonia terrae* CIP I-2194 under aerobic conditions in the presence of a growth substrate, wherein said bacterium shows no latency in growth when cultured in the presence of the growth substrate, and wherein said contaminant contained in the effluent is degraded in the presence of at least said growth substrate by at least the biomass of said bacteria thus produced.

16. A process for the treatment of an aqueous effluent containing at least one contaminant selected from the group consisting of ethyl tert-butyl ether (ETBE), methyl tert-butyl ether (MTBE), and tert-amyl methyl ether (TAME) in order to reduce the concentration of said contaminant, wherein said process comprises growing at least one bacterium *Gordonia terrae* CIP I-2194 under aerobic conditions in the presence of a growth substrate, wherein said bacterium constitutively produces the enzymes for reducing the concentration of said contaminant, and wherein said contaminant contained in the effluent is degraded in the presence of at least said growth substrate by at least the biomass of said bacteria thus produced.

* * * * *